March 20, 1945.  E. R. WORKMAN  2,371,664
WELDING TOOL
Filed July 16, 1943  2 Sheets-Sheet 2

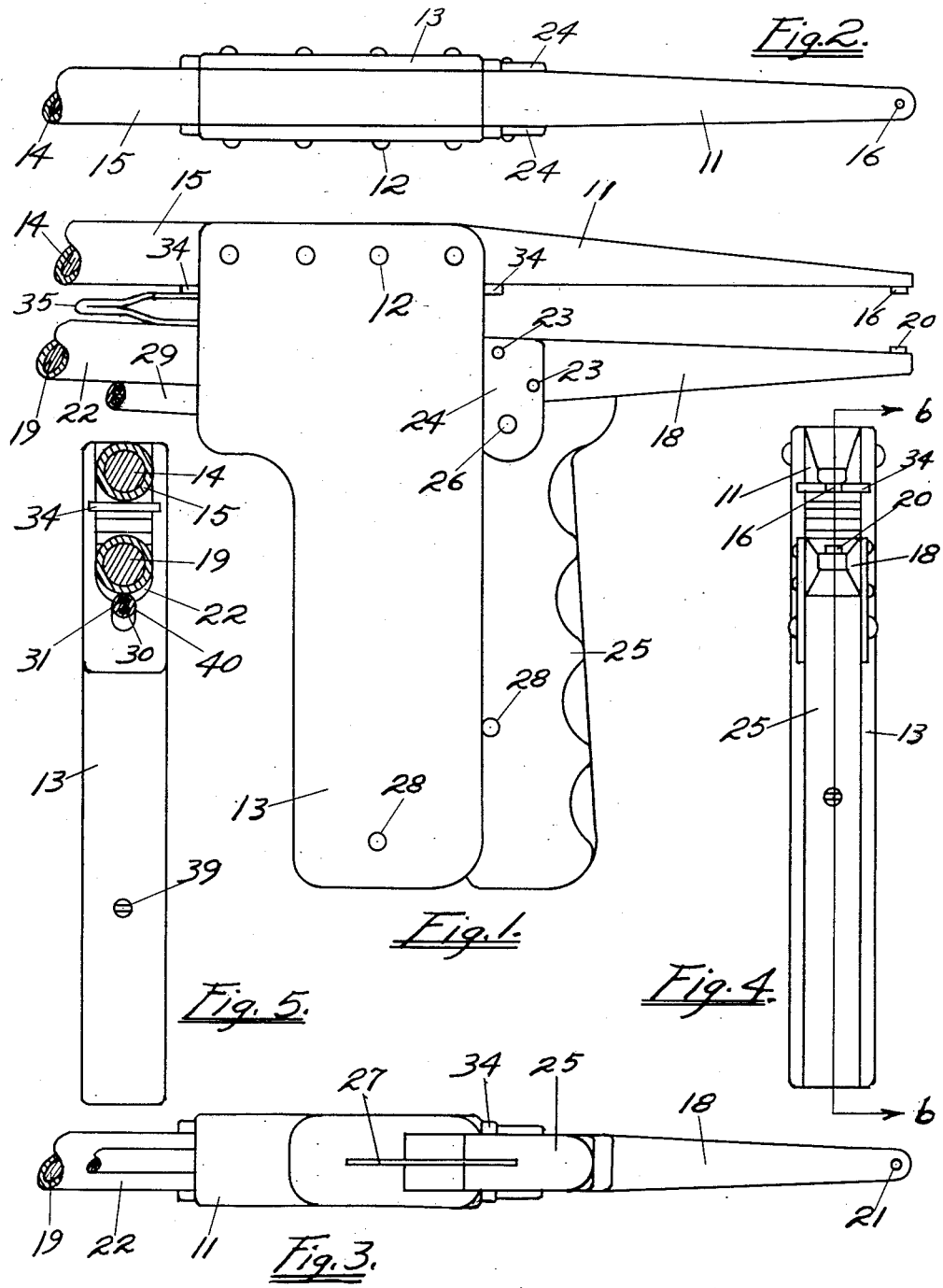

Ernest Robert Workman,
Inventor.

Patented Mar. 20, 1945

2,371,664

UNITED STATES PATENT OFFICE 2,371,664

WELDING TOOL

Ernest Robert Workman, Chicago, Ill.

Application July 16, 1943, Serial No. 495,009

12 Claims. (Cl. 219—4)

This invention relates to improvements in portable spot welding tools for use preferably in welding circuits which include timing and cycle counting apparatus limiting the amount of electric power consumed in each weld to that necessary to fuse the metal in the weld so that it may be caused to flow and to be compacted into a substantial weld under pressure exerted and controlled by the improved tool.

One principal object of the invention is to simplify construction by eliminating parts, weight and mechanisms so as to provide a portable tool that can be conveniently held and manipulated by one hand without fatigue to the user during periods of continuous operation.

Another object of the invention is the provision of a tool that will exert the necessary pressure that is required to flow and compact the molten metal into a substantial weld with but a minimum of exertion on the part of the operator; and a further object of the invention is to provide such a tool with mechanism that requires but a single spring to return and hold the welding terminals of the tool in their normal open position after each welding operation has been completed, to limit the pressure that can be applied by the welding terminals on the fused metal of the weld, to maintain the limited pressure of the welding terminals on the fused metal while the movable mechanism of the tool is held against a stop and to move the movable welding terminal of the tool in response to action by the molten metal in the weld.

These and other objects of the invention I accomplish by providing a portable tool to be operated by one hand in much the same manner as is involved in operating the well known firearm of the pistol grip type, but the trigger of the welding tool is provided with sufficient strength and movement to operate the mechanism of the tool in such a manner that it requires but a small amount of exertion on the part of the operator.

The manner of constructing and operating a tool which includes these improvements and which is designed for use in a welding circuit that includes means for limiting the amount of electric power consumed in making each weld will be best understood by reference to the accompanying drawings, in which:

Figure 1 is a side view of a tool which includes the improvements herein referred to.

Figure 2 is a top view of the tool shown in Figure 1.

Figure 3 is a bottom view of said tool.

Figure 4 is a front view of the tool.

Figure 5 is a rear view of the tool.

Figure 6:
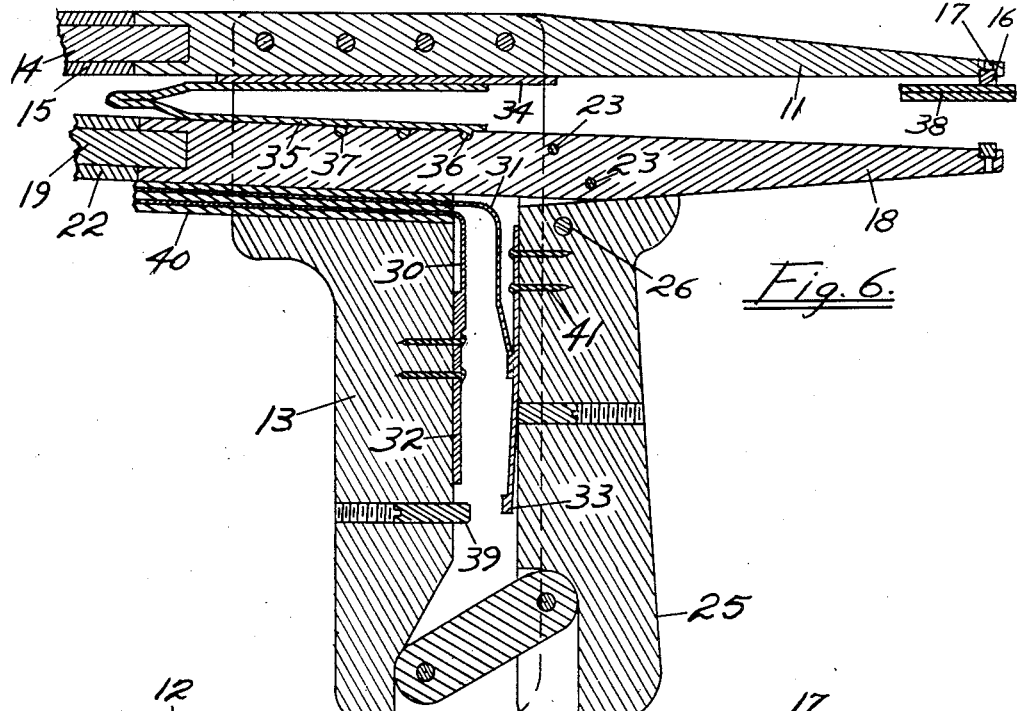
Figure 6 is a vertical sectional view of the tool, taken at the line 6—6 on Figure 4.

Referring now more in detail to the several figures in the drawings, 11 is one terminal of a welding circuit to which there is rigidly secured, by four pins 12, a handle 13, composed of electrical insulating material. A flexible cable 14, soldered into a socket in the rear end of this terminal, is covered with insulating material 15 and serves to supply the terminal with electric welding power from a source of controlled supply. A welding tip 16 is pressed into a tight fitting counterbore in the terminal 11, and a hole 17 provides for insertion of a punch when it is desired to remove the tip.

Movably mounted in the handle 13 is a second welding terminal 18, which has a flexible cable 19 soldered into a socket in its rear end to connect this second terminal into the welding circuit. The insulation on this second cable is shown at 22 and the terminal has a tip 20, and a hole 21, similar to and for the same purpose as those of the terminal 11.

Rigidly secured to the terminal 18, by two pins 23, are two plates 24 that serve as a connection between this terminal 18 and a trigger 25 made of insulating material, when a pin 26 has been inserted in the plates 24 and through the trigger. A toggle link 27 is pivoted at its lower end to the handle 13, and at its upper end to the trigger by means of pins 28, to complete a toggle connection between the handle and the terminal 18, for controlling the movement of this terminal when movement of the trigger takes place.

Embedded in the handle 13 is a third cable 29, which carries two conducting wires 30 and 31, that are connected to the contact terminals 32 and 33, respectively, and have their opposite ends connected to a circuit that includes apparatus for controlling and limiting the amount of power that can pass through the welding circuit after the contact terminals 32 and 33 have been brought into engagement with each other by movement of the trigger.

Mounted between the terminals 11 and 18, and insulated from terminal 11, by a fibre strip 34, is a spring 35 that is positioned longitudinally by a projection 36 which fits into one of the notches 37 in this terminal 18; this spring serves to return the terminal 18, the trigger, toggle and other moving parts to normal position after each operation has been completed and to hold these parts in this position, ready for a succeeding operation. This "normal position" is illustrated by Figures 1 and 6, showing the terminals 11 and 18 at their position of maximum separation. As hereinafter explained, this spring also serves to limit the pressure that can be applied on the work 38, during fusing of the weld, and also it provides for moving the terminal 18 in response to the action caused by the flowing and compacting of the molten metal that is necessary to insure a substantial weld.

Adjustment of the pressure of the terminals on the weld during the period of fusion and cooling is accomplished by turning the screw 39, and also by moving the projection 36 on the spring into a different notch in the terminal 18, and adjustment of the closing position of the contacts 32 and 33 in relation to the movement of the trigger is accomplished by means of the screw 42.

The handle 13 is slotted to provide for mounting and movement of the trigger and both the handle and the trigger are slotted to accommodate the toggle link 27, as will be understood by reference to Figure 3.

Figure 7:
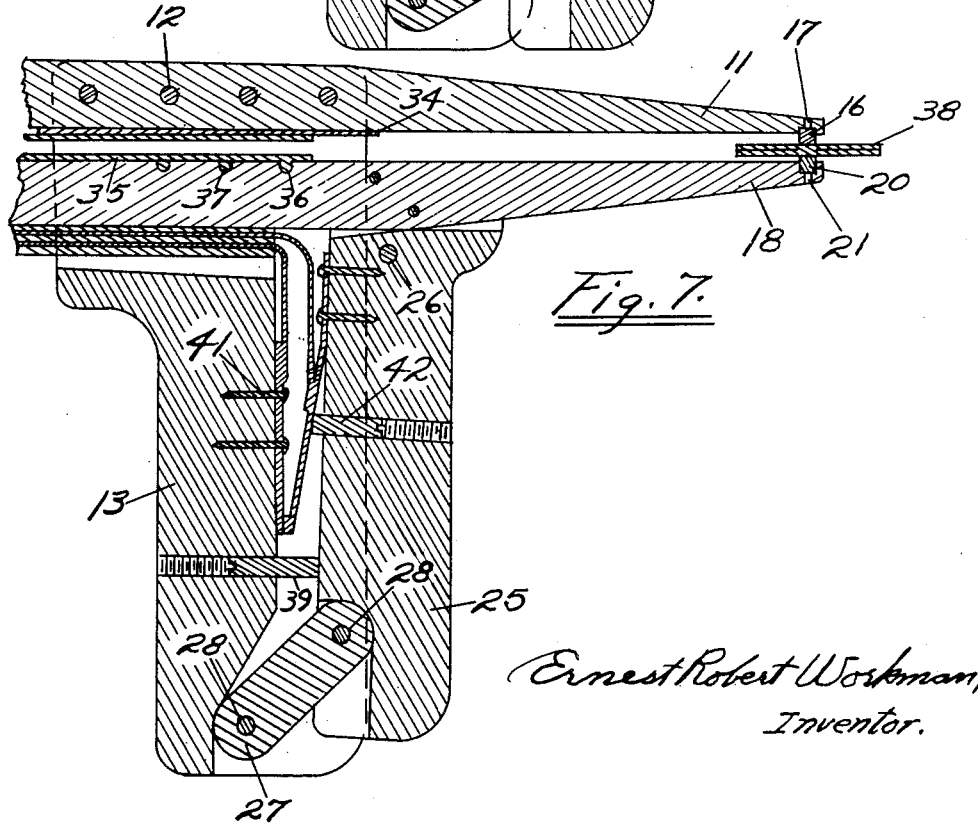
Figure 7 is another vertical sectional view of the tool like Figure 6, but showing the tool in a welding position.

To operate the tool, it is gripped by the handle and the work is placed between the welding points, as shown in Figure 6; the trigger is then pressed to the position shown by Figure 7, and held in this position until the molten metal of the weld has cooled sufficiently to hold. The pressure on the trigger is then released and the spring is allowed to return the mechanism to its normal position and to maintain it in this position until the start of a succeeding operation.

As the trigger starts to move from its normal position, as shown in Figures 1, 4 and 6, toward the position shown in Figure 7, the toggle action of the link 27, around its pivots 28, forces the trigger upward so that through its connections comprising the plates 24, pins 23, and the pivot 26, it moves the front end of the terminal 18 toward the front end of terminal 11 until the welding points 16 and 20 are brought against the work 38, which has been placed between these points.

The movement of the lower terminal up to this point forces the spring 35 to yield by pressure exerted on its outer front ends, so that little effort on the part of the operator is necessary to cause this yielding of the spring; meanwhile the toggle link is shifted from its most nearly horizontal position to a more vertical position where it can cause greater lift on the terminal 18, with less and less exertion by the operator.

However, after the welding points 16 and 20 have been forced into contact with the work 38, any further movement of the trigger in this same direction can only take place by movement of the rear end of the terminal 18, against the greatly increased resistance offered by the spring 35, which must then be forced to yield by pressure on the more inward portions of its legs, and this increased pressure to cause the spring to yield is accompanied by proportionately increased pressure of the welding points on the work, but since the former movement of the trigger will have brought the toggle link to a more vertical position, this increased pressure of the welding points on the work is brought about by the toggle plate acting in conjunction with the trigger with but little extra effort on the part of the operator.

This increased pressure on the welding points against the work while the weld is taking place is necessary to flow and compact the molten metal into a substantial weld and to hold the weld in this substantial state until it has cooled sufficiently to carry its own load. As hereinbefore mentioned, the pressure of the welding points during fusion and cooling of the weld can be controlled either by adjusting the screw 39, or by moving the spring 35, so that its projection 36 will engage a different notch 37 in the lower terminal 18.

During fusing of the metal in making a weld in the work, the molten metal, through flow and compacting under pressure of the welding points, will allow these points to move a distance toward each other limited by the heat employed in making the weld, while the mechanism moved by the trigger has been brought to a stop by the screw 39; therefore, the mounting of the spring as shown will maintain the pressure on the terminal 18, so as to turn it around its pivot 26, in response to the action of the molten metal and maintain the pressure of the welding points on the weld until the metal has cooled sufficiently to carry its load.

As movement of the trigger takes place it carries with it one of the terminals 33, of the initiating circuit, until this terminal is brought into contact with the opposite terminal 32, of this initiating circuit, and starts the welding current in the welding circuit. The screw 42, should be adjusted so that it will bring the contacts 32 and 33 together and close the initiating circuit immediately after the welding points have been forced against the work. As hereinbefore mentioned, this initiating circuit includes timing or cycle-counting apparatus which serves to open the initiating circuit when a predetermined amount of electric power has been admitted to a weld.

I claim:

1. In a welding tool, a pair of terminals with welding tips carried thereby, compressible spring means normally holding said terminals and their tips apart, a handle rigidly attached to one of said terminals and an operating member pivotally connected to the other terminal at a point intermediate its welding tip and the area of said terminal on which the spring means bears.

2. In the tool defined by claim 1, said spring means being adjustable to vary the distance of its bearing area on the terminal from said pivotal connection of said terminal to the operating member.

3. In a welding tool, a pair of terminals with welding tips carried thereby, compressible spring means normally holding said terminals and their tips apart, a handle rigidly attached to one of said terminals and an operating member movable relatively to said handle, the other terminal being rockably mounted on the operating member at a point intermediate its welding tip and the area of said terminal on which the spring means bears, whereby said spring means when compressed rocks the terminal in response to displacement of the molten metal during a weld.

4. In a welding tool as defined by claim 3, adjustable means limiting compression of the spring by the operating member.

5. In a welding tool, a handle comprising a stationary member and a movable member, a pair of terminals arranged in overlying and substantially parallel relation with one of said terminals being fixed to said stationary member, and the other of said terminals being pivotally mounted intermediate its ends to said movable member whereby the opposite ends of said other terminal may be rocked relative to said one terminal.

6. In a welding tool, a handle comprising a stationary pistol grip member, and a movable trigger member, a pair of terminals arranged in overlying and substantially parallel relation with one of said terminals being fixed to said stationary member, and the other of said terminals being pivotally mounted intermediate its ends to said trigger member, said terminal members carrying welding tip members at corresponding ends thereof, and spring means disposed between said terminals at the ends thereof opposite the ends carrying said welding tip members.

7. In a welding tool, a handle comprising a stationary member, and a movable member, a pair of terminals arranged in overlying and normally substantially spaced parallel relation with one of said terminals being fixed to said stationary member, and the other of said terminals being pivotally mounted intermediate its ends to said movable member, and a link pivotally connected to said stationary member and to said movable member providing for movement of said other terminal toward said one terminal and rocking of the opposite ends of the former relative to the latter.

8. In a welding tool, a handle comprising a stationary member, and a movable member, a pair of terminals arranged in overlying and normally substantially spaced parallel relation with one of said terminals being fixed to said stationary member, and the other of said terminals being pivotally mounted intermediate its ends to said movable member, said terminal members carrying welding tip members at corresponding ends thereof, spring means disposed between said terminal members at the ends thereof opposite the ends carrying said welding tip members, and a link pivotally connected to said stationary member and said movable member providing for movement of said other terminal toward said one terminal and rocking of the opposite ends of the former relative to the latter.

9. In a welding tool, a handle comprising a stationary member, and a movable member, a pair of terminals arranged in overlying and normally substantially spaced parallel relation with one of said terminals being fixed to said stationary member, and the other of said terminals being pivotally mounted intermediate its ends to said movable member, said terminal members carrying welding tip members at corresponding ends thereof, spring means disposed between said terminal members at the ends thereof opposite the ends carrying said welding tip members, a link pivotally connected to said stationary member and said movable member providing for movement of said other terminal toward said one terminal to bring initially said welding tip members in welding position and for thereafter rocking the opposite end of said other terminal toward said one terminal, and contacts carried by said stationary member and said movable member adapted to be engaged with each other for controlling a welding circuit for said terminal upon movement of said movable member toward said stationary member.

10. The welding tool of claim 8 characterized by the provision of means between said stationary member and said movable member for limiting movement of the latter relative to the former and thereby limit the compression of the spring means disposed between said members.

11. The welding tool of claim 9 characterized by the provision of means for adjusting the position of one of the contacts carried by the stationary and movable members.

12. In a welding tool, a stationary terminal member, a second terminal member movable relative to said stationary terminal member and pivotally mounted intermediate its ends, a spring disposed between said terminal members and lying to one side of the pivotal mounting of said second terminal, and means for compressing said spring to bring one end of said second terminal in welding position relative to one end of said stationary terminal and thereafter rock said second terminal about its pivot further compressing said spring and moving the other end of said second terminal toward said stationary terminal whereby said spring causes said one end to move toward said stationary terminal upon displacement of molten metal in a weld.

ERNEST ROBERT WORKMAN.